United States Patent
Alvarez

(10) Patent No.: US 9,559,499 B2
(45) Date of Patent: Jan. 31, 2017

(54) DISTRIBUTION PANEL WITH DUAL MOVABLE TRAYS

(71) Applicant: REALM Communications Group, Inc., Milpitas, CA (US)

(72) Inventor: Bryce K. Alvarez, Milpitas, CA (US)

(73) Assignee: R&M USA Inc., Milpitas, CA (US)

( * ) Notice: Subject to any disclaimer, the term of this patent is extended or adjusted under 35 U.S.C. 154(b) by 0 days.

(21) Appl. No.: 14/189,956

(22) Filed: Feb. 25, 2014

(65) Prior Publication Data

US 2014/0238945 A1    Aug. 28, 2014

Related U.S. Application Data

(60) Provisional application No. 61/769,698, filed on Feb. 26, 2013.

(51) Int. Cl.
```
A47F 7/00     (2006.01)
H02B 1/01     (2006.01)
H02B 1/30     (2006.01)
H04Q 1/02     (2006.01)
```

(52) U.S. Cl.
CPC ........ *H02B 1/01* (2013.01); *H02B 1/30* (2013.01); *H04Q 1/023* (2013.01); *H04Q 1/13* (2013.01)

(58) Field of Classification Search
CPC ............. H02B 1/01; H02B 1/30; H04Q 1/023; H04Q 1/13
USPC ......... 211/26, 26.2; 361/622, 627, 641, 645, 361/725, 727, 728; 312/223.2, 223.6; 385/135
See application file for complete search history.

(56) References Cited

U.S. PATENT DOCUMENTS

| | | | |
|---|---|---|---|
| 1,682,060 A * | 8/1928 | Banks | 211/43 |
| 3,606,019 A * | 9/1971 | Dubiel | 211/26 |
| 4,500,146 A * | 2/1985 | Peterson | 312/257.1 |
| 5,066,149 A | 11/1991 | Wheeler | |
| 5,067,784 A * | 11/1991 | Debortoli et al. | 385/53 |
| 5,216,581 A * | 6/1993 | Fisher et al. | 361/728 |
| 5,375,185 A * | 12/1994 | Hermsen et al. | 385/135 |
| 5,402,515 A * | 3/1995 | Vidacovich | G02B 6/4455 385/135 |
| D444,656 S * | 7/2001 | West | D6/574 |

(Continued)

OTHER PUBLICATIONS

U.S. Appl. No. 14/189,960, filed Feb. 25, 2014 by REALM Communications Group, Inc., 8 pages.

(Continued)

*Primary Examiner* — Joshua J Michener
*Assistant Examiner* — Devin Barnett
(74) *Attorney, Agent, or Firm* — Silicon Valley Patent Group LLP

(57) ABSTRACT

A rackmount distribution panel includes two movable, e.g., sliding, trays to provide full access to the distribution panel from both the front and the rear of the distribution panel. Consequently, the distribution panel may be easily and conveniently accessed to install, secure, and route cabling during installation, upgrades, service or repair, even when the distribution panel has already been mounted to a rack. The distribution includes a front tray, and a front tray movably coupled to the frame configured to be moved in a forward direction and a rear tray movably coupled to the tray and configured to be moved in a rear direction. The front and rear trays are configured to receive and secure a cable and to provide access to the cable by moving in the forward or rear directions. The front tray may move in the rear direction with the rear tray.

9 Claims, 3 Drawing Sheets

(56) References Cited

U.S. PATENT DOCUMENTS

| | | | | |
|---|---|---|---|---|
| 6,301,424 B1 * | 10/2001 | Hwang | ............. | G02B 6/4452 385/134 |
| 6,438,310 B1 * | 8/2002 | Lance et al. | ............. | 385/135 |
| 6,504,988 B1 * | 1/2003 | Trebesch | ............. | G02B 6/4455 385/135 |
| 6,925,241 B2 * | 8/2005 | Bohle | ............. | G02B 6/4455 385/134 |
| 6,944,383 B1 * | 9/2005 | Herzog et al. | ............. | 385/123 |
| 7,007,614 B2 * | 3/2006 | Gaunt et al. | ............. | 108/102 |
| 7,218,513 B2 * | 5/2007 | Yang et al. | ............. | 361/679.33 |
| 7,221,562 B2 * | 5/2007 | Song | ............. | 361/679.06 |
| 7,227,760 B1 * | 6/2007 | Chang | ............. | 361/801 |
| 7,308,184 B2 * | 12/2007 | Barnes et al. | ............. | 385/135 |
| 7,710,508 B2 * | 5/2010 | Jung et al. | ............. | 349/58 |
| 7,715,681 B2 * | 5/2010 | Krampotich | ............. | G02B 6/4455 385/134 |
| 7,876,993 B2 * | 1/2011 | Krampotich | ............. | G02B 6/4455 211/126.15 |
| 7,987,799 B2 * | 8/2011 | Lange et al. | ............. | 108/102 |
| 7,999,183 B2 * | 8/2011 | Garza et al. | ............. | 174/100 |
| 8,280,216 B2 | 10/2012 | Cooke et al. | | |
| 8,433,171 B2 * | 4/2013 | Cooke | ............. | G02B 6/4453 385/135 |
| 8,452,148 B2 * | 5/2013 | Cooke | ............. | G02B 6/4455 385/135 |
| 8,452,149 B2 * | 5/2013 | Krampotich et al. | ............. | 385/135 |
| 8,483,536 B2 * | 7/2013 | Krampotich et al. | ............. | 385/135 |
| 8,714,368 B2 * | 5/2014 | Tichy | ............. | 211/26 |
| 8,842,959 B2 * | 9/2014 | Schriel et al. | ............. | 385/135 |
| 8,953,924 B2 * | 2/2015 | Cote | ............. | G02B 6/4471 385/135 |
| 9,020,319 B2 * | 4/2015 | Anderson et al. | ............. | 385/135 |
| 9,116,324 B2 * | 8/2015 | Cooke | ............. | G02B 6/4452 |
| 9,128,262 B2 * | 9/2015 | Campbell | ............. | G02B 6/4452 |
| 2002/0190613 A1 * | 12/2002 | Liu | ............. | 312/223.2 |
| 2003/0002261 A1 * | 1/2003 | Berry et al. | ............. | 361/727 |
| 2004/0136676 A1 * | 7/2004 | Mertesdorf | ............. | G02B 6/4455 385/135 |
| 2007/0104447 A1 * | 5/2007 | Allen | ............. | 385/135 |
| 2008/0085092 A1 | 4/2008 | Barnes | | |
| 2008/0205844 A1 * | 8/2008 | Castonguay et al. | ............. | 385/135 |
| 2009/0060440 A1 * | 3/2009 | Wright et al. | ............. | 385/135 |
| 2009/0290842 A1 * | 11/2009 | Bran de Leon et al. | ............. | 385/135 |
| 2010/0086267 A1 * | 4/2010 | Cooke et al. | ............. | 385/100 |
| 2010/0183270 A1 * | 7/2010 | Davis et al. | ............. | 385/100 |
| 2010/0296791 A1 * | 11/2010 | Makrides-Saravanos et al. | ............. | 385/135 |
| 2010/0322578 A1 * | 12/2010 | Cooke et al. | ............. | 385/135 |
| 2010/0322579 A1 * | 12/2010 | Cooke et al. | ............. | 385/135 |
| 2011/0235985 A1 * | 9/2011 | Cote et al. | ............. | 385/135 |
| 2011/0255836 A1 * | 10/2011 | Krampotich et al. | ............. | 385/135 |
| 2011/0268404 A1 * | 11/2011 | Cote | ............. | G02B 6/4452 385/135 |
| 2011/0280537 A1 * | 11/2011 | Cowen et al. | ............. | 385/135 |
| 2011/0297629 A1 * | 12/2011 | Knudsen et al. | ............. | 211/26 |
| 2012/0008257 A1 * | 1/2012 | Rebers et al. | ............. | 361/622 |
| 2012/0114295 A1 * | 5/2012 | Guzzo et al. | ............. | 385/135 |
| 2012/0219262 A1 * | 8/2012 | Hendrix et al. | ............. | 385/135 |
| 2012/0219263 A1 * | 8/2012 | Beamon et al. | ............. | 385/135 |
| 2013/0048581 A1 * | 2/2013 | Kuo | ............. | 211/26 |
| 2013/0188919 A1 * | 7/2013 | Cubala et al. | ............. | 385/135 |
| 2013/0322839 A1 * | 12/2013 | Claessens et al. | ............. | 385/135 |
| 2014/0003782 A1 * | 1/2014 | Blackwell et al. | ............. | 385/135 |
| 2014/0160687 A1 * | 6/2014 | Hu et al. | ............. | 361/727 |
| 2014/0167578 A1 * | 6/2014 | Lesser et al. | ............. | 312/223.2 |
| 2014/0226944 A1 * | 8/2014 | Ray et al. | ............. | 385/135 |
| 2014/0233903 A1 * | 8/2014 | Valderrabano Berrones et al. | ............. | 385/135 |
| 2014/0241667 A1 * | 8/2014 | Cote et al. | ............. | 385/59 |
| 2014/0247541 A1 * | 9/2014 | Alvarez | ............. | 361/627 |
| 2015/0063771 A1 * | 3/2015 | Mogul et al. | ............. | 385/135 |
| 2015/0071597 A1 * | 3/2015 | Beamon et al. | ............. | 385/135 |
| 2015/0241653 A1 * | 8/2015 | Krampotich | ............. | G02B 6/4452 385/135 |

OTHER PUBLICATIONS

Office Action by Examiner Pape mailed on Sep. 9, 2015, for U.S. Appl. No. 14/189,960, filed Feb. 25, 2014, 9 pages.

* cited by examiner

DISTRIBUTION PANEL WITH DUAL MOVABLE TRAYS

CROSS REFERENCE TO RELATED APPLICATIONS

This application claims priority under 35 USC 119 to U.S. Provisional Application No. 61/769,698, filed Feb. 26, 2013, all of which is incorporated by reference herein in its entirety.

FIELD OF THE INVENTION

The described embodiments relate to rackmount distribution panels and in particular to rackmount distribution panels for storing and accessing cables, e.g., used in the telecommunications industry.

BACKGROUND

Rackmount distribution panels are used, e.g., in the telecommunications industry, to access and store cables. Ease of access to the cables in distribution panels, e.g., for service and upgrade, is an important consideration. Another important consideration is the ability to store the cables to prevent damage. Typically the need to secure cables to prevent damage is at odds with the need for ease of access to the cables.

For example, conventional rackmount distribution panels typically are mounted to a rack and the cable enters the distribution panel from the back and is secured to the distribution panel. Accordingly, access to the cable is restricted.

SUMMARY

A rackmount distribution panel includes two movable, e.g., sliding, trays to provide full access to the distribution panel from both the front and the rear of the distribution panel. Consequently, the distribution panel may be easily and conveniently accessed to install, secure, and route cabling during installation, upgrades, service or repair, even when the distribution panel has already been mounted to a rack. The distribution includes a front tray that is configured to be mounted to a rack, and a front tray movably coupled to the frame configured to be moved in a forward direction and a rear tray movably coupled to the tray and configured to be moved in a rear direction. The front and rear trays are configured to receive and secure a cable and to provide access to the cable by moving in the forward or rear directions. The front tray may move in the rear direction with the rear tray.

DETAILED DESCRIPTION

Figure 1:
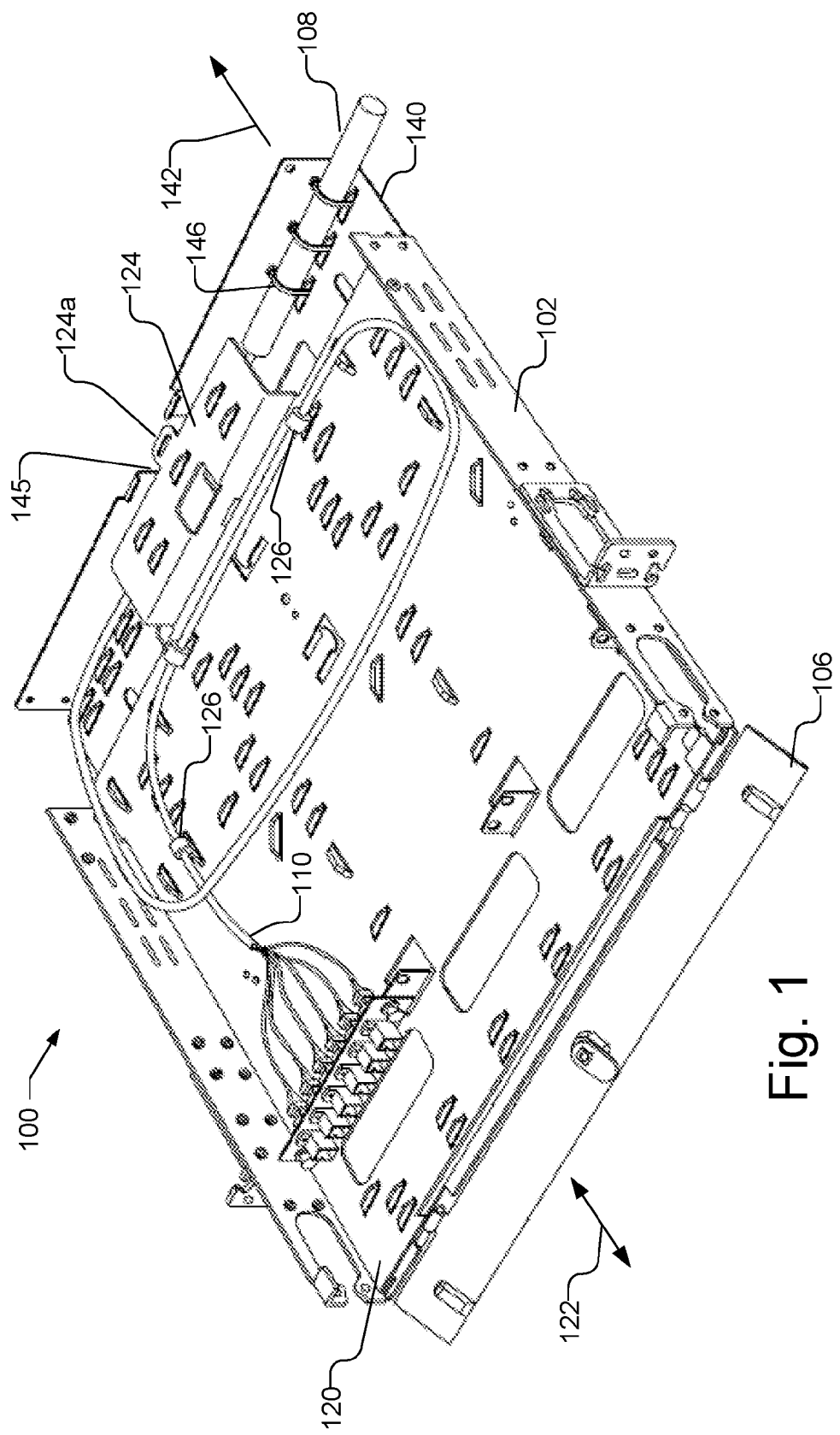
FIG. 1 illustrates a rackmount distribution panel with a two movable trays in a closed position.
Figure 2:
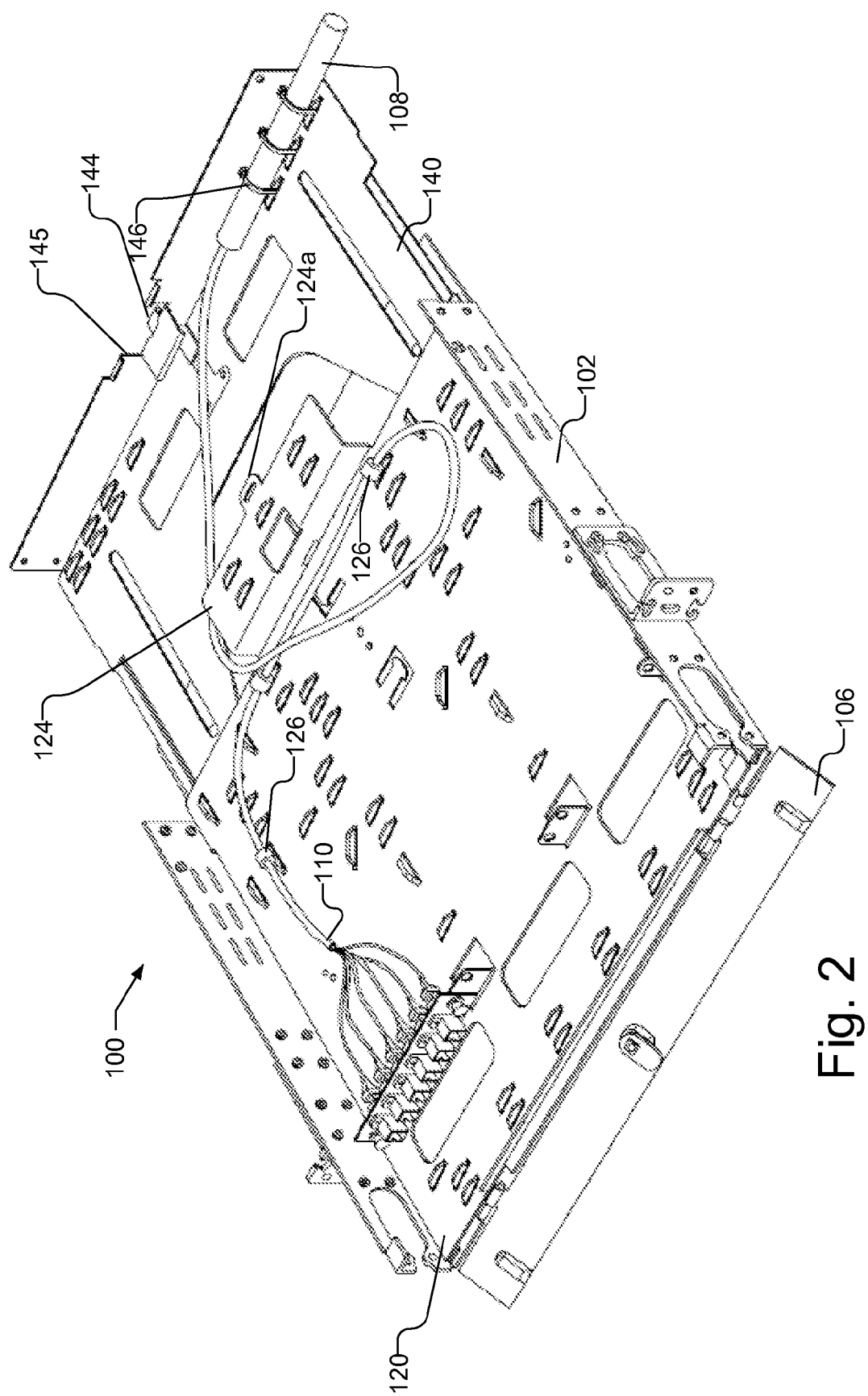
FIG. 2 illustrates the rackmount distribution panel with the rear tray opened in a rear direction.
Figure 3:
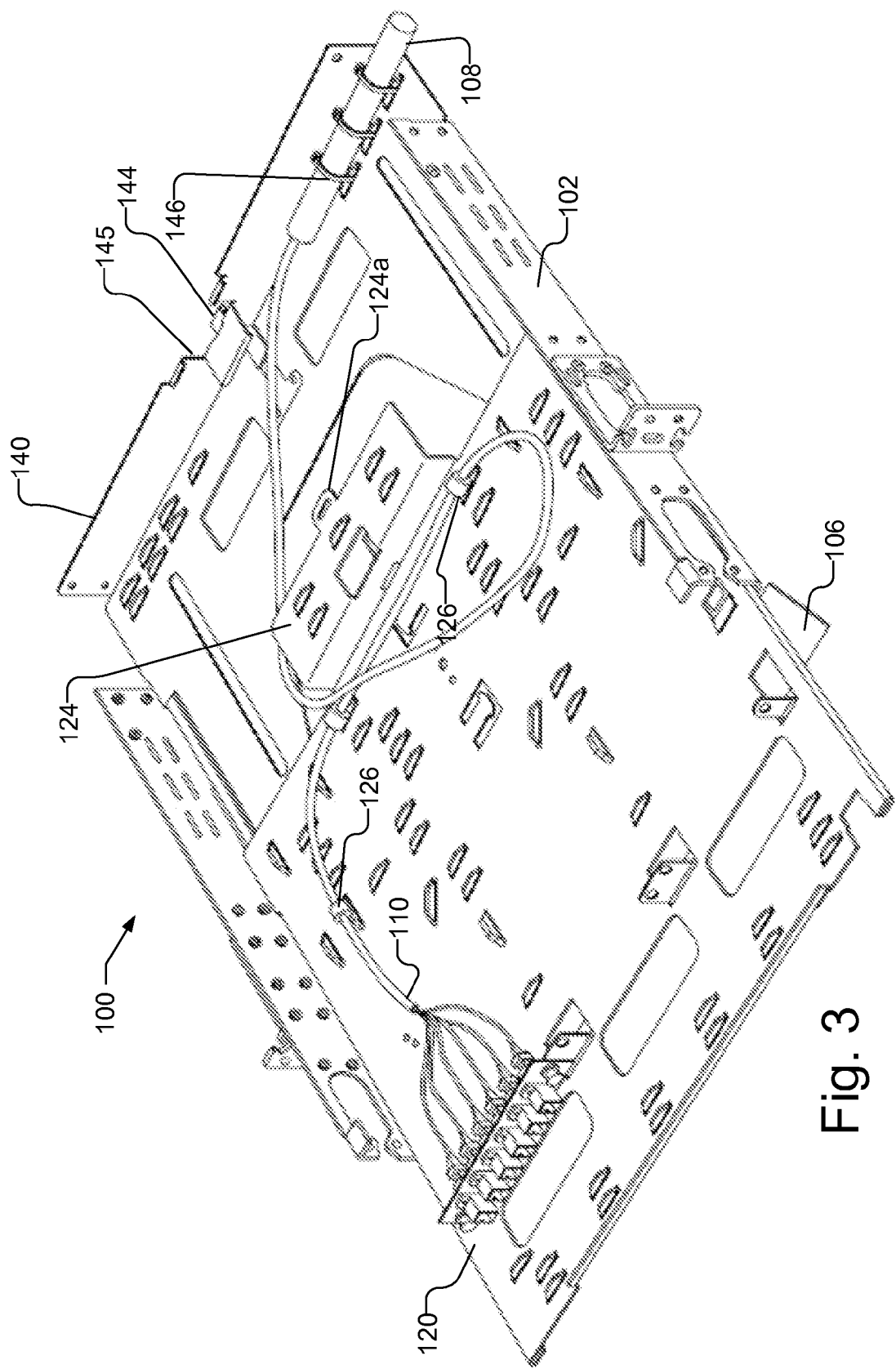
FIG. 3 illustrates the rackmount distribution panel with the front tray opened in a forward direction.

FIG. 1 illustrates a rackmount distribution panel 100 that includes a frame 102 and two moving trays; a front tray 120 that is movable to the front of the distribution panel 100 and a rear tray 140 that is movable to the rear of the distribution panel 100. FIG. 2 is similar to FIG. 1 and shows the rackmount distribution panel 100 with the rear tray 140 opened by moving, e.g., sliding, in a rear direction. FIG. 3 is similar to FIG. 1 and shows the rackmount distribution panel 100 with the front tray 120 opened by moving, e.g., sliding, in a forward direction. The front tray 120 may also move by moving, e.g., sliding, in a rear direction with the rear tray 140.

Rack space is becoming increasingly restricted as increased Internet traffic requires more and more data channels to be routed through existing facilities. Consequently, telecommunications providers are seeking to put more data channels in less space, making smaller distribution panels more common. For example, the rackmount distribution panel 100 shown in FIG. 1 may be a 1U distribution panel, which is 1.75" tall. As a result, space inside the rackmount distribution panels 100 is very restricted. Accordingly, to allow ready access to the interior of a rackmount distribution panel 100 that is installed on a rack, two sliding (or otherwise movable) trays 120 and 140 are used, as illustrated in FIGS. 1, 2, and 3.

The rackmount distribution panel 100 includes a frame 102 that is configured to be mounted to a rack (not shown). A door 106 may be coupled to the front of the frame 102. A front tray 120 is movably coupled to the frame 102 and is configured to be moved in a forward direction with respect to the frame 102, as illustrated by arrow 122, to provide unrestricted access to cables in the distribution panel 100 from the front. The rear tray 140 is also movably coupled to the frame 102 and is configured to be moved in a rear direction with respect to the frame 102 that is opposite the forward direction, as illustrated by arrow 142. The front tray 120 may include a raised shelf 124 that includes a tab 124a that extends through an opening 145 in the rear tray 140 when the front tray 120 and the rear tray 140 are in a closed position, i.e., are positioned in the frame 102, as illustrated in FIG. 1. As illustrated by arrow 122, the front tray 120 may be further configured to be moved in the rear direction with the rear tray 140. Moreover, both the front tray 120 and the rear tray 140 may be slid entirely out of the frame 102 for full access to the entire distribution panel 100 and convenience of servicing the cables inside, e.g., allowing full access to install, secure, and route the cabling during installation, upgrades, service or repair, even when the distribution panel 100 is mounted to a rack.

The front tray 120 and rear tray 140 may be slidably coupled to the frame 102, so that the front tray 120 and rear tray 140 slide in the forward and rear directions. For example, the rear tray 140 may engage the sides of the frame 102, e.g., guides on the sides of the frame 102, and slide out the back of the frame 102, while the front tray 120 may engage the sides of the frame 102, e.g., guides, and slide out the front or the back of the frame 102. As illustrated in FIG. 1, the rear tray 140 may slide under the front tray 120. In another embodiment, the front tray 120 and rear tray 140 may be rotatably coupled to the frame 102, e.g., on hinges or pivots, so that the front tray 120 and rear tray 140 rotate or swing out in the forward and rear directions. When moved to an open position, such as illustrated in FIGS. 2 and 3, the rear tray 140 and front tray 120 provide access to any cable secured in the distribution panel 100.

As can be seen in FIGS. 2 and 3, the rear tray 140 includes a latch element 144, e.g., a spring operated latch, that engages the raised shelf 124 to hold the rear tray 140 to the raised shelf 124 so that the rear tray 140 may be secured from sliding. The latch element 144 may be easily released to allow the rear tray 140 to slide out the back of the frame 102 to allow access to the rear of the distribution panel 100; even when the distribution panel is installed in a rack with another distribution panel in place above and below it. If desired, the rear tray 140 may be further secured with additional hardware.

The rear tray 140 and the front tray 120 are configured to receive and secure one or more cables. As illustrated in FIG. 1, for example, a main cable 108 is secured to the rear tray 140 while a cable 110 is secured to the front tray 120. Cable controls 146 may hold a main cable 108 to the rear tray 140, while cable controls 126 may hold one or more cables 110 that extend from the main cable 108 to the front tray 120 to prevent tangling or snagging of the cable. If desired, cables 110 may be enclosed in spiral wrap or other similar material. The cable 110 may loop, i.e., festoon, without tangling, and the front tray 120 and rear tray 140 may slide without interference from or damaging the cable 110. If desired, cable control may be effected with the use of two hinged arms; where one end of each arm is rotatably secured to the front tray 120 and the rear tray 140 respectively, and rotatably secured to the other arm at the other end. Any other cable festoon management mechanism may also be employed, including but not limited to linked channels, hinged arms, wire rope, trolleys, associated radius control methods and other conventional mechanisms.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A rackmount distribution panel for storing and accessing telecommunications cables, the rackmount distribution panel comprising:
   a frame configured to be mounted to a rack; a front tray movably engaged with the frame and movable in a forward direction with respect to the frame when the frame is mounted to the rack, the front tray comprising a plurality of cable controls configured to receive and secure a first cable and to provide access to the first cable from a front of the frame by moving in the forward direction while remaining engaged with the frame;
   a rear tray comprising a latch element located in an opening in a rear surface, and a plurality of cable controls extending upwardly from a bottom surface of the rear tray, wherein said rear tray is movably engaged with the frame and movable in a rear direction with respect to the frame that is opposite the forward direction when the frame is mounted to the rack, said plurality of cable controls of the rear tray being configured to receive and secure a second cable and to provide access to the second cable from a rear of the frame by moving the rear tray in the rear direction while remaining engaged with the frame, wherein the rear tray is substantially underneath the front tray; and
   wherein the front tray is further movable in the rear direction to provide access to the first cable from the rear of the frame by moving in the rear direction, and the front tray and the rear tray are removable from the rear of the frame by moving the front tray and the rear tray in the rear direction; wherein the front tray comprises a raised shelf with a tab that extends through said opening in the rear surface of said rear tray when the front tray and the rear tray are positioned in the frame.

2. The rackmount distribution panel of claim 1, wherein the rear tray is slidably coupled to the frame and slides in the rear direction.

3. The rackmount distribution panel of claim 1, wherein the front tray is slidably coupled to the frame and slides in the forward direction.

4. The rackmount distribution panel of claim 3, wherein the front tray further slides in the rear direction with the rear tray.

5. The rackmount distribution panel of claim 1, wherein said latch element is configured to engage the raised shelf.

6. A rackmount distribution panel for storing and accessing telecommunications cables, the rackmount distribution panel comprising: a frame configured to be mounted to a rack;
   a front tray slidably engaged with the frame and configured to slide in a forward direction with respect to the frame when the frame is mounted to the rack; and
   a rear tray slidably engaged with the frame and configured to slide under the front tray and in a rear direction with respect to the frame when the frame is mounted to the rack;
   wherein the front tray comprises a first plurality of cable controls that are configured to receive and secure cables and the rear tray comprises a latch element located in an opening in a rear surface, and a second plurality of cable controls extending upwardly from a bottom surface of the rear tray, said first and second plurality of cable controls are configured to receive and secure cables and the front tray provides access to the cables from a front of the frame when slid in the forward direction and the rear tray provides access to the cables from a rear of the frame when slid in the rear direction that is opposite the forward direction, wherein the front tray is further slidable in the rear direction with the rear tray and to provide access to the cables from the rear of the frame when slid in the rear direction, and wherein the front tray and the rear tray are removable from the rear of the frame by sliding the front tray and the rear tray in the rear direction; wherein the front tray comprises a raised shelf with a tab that extends through said opening in the rear surface of said rear tray when the front tray and the rear tray are positioned in the frame.

7. The rackmount distribution panel of claim 6, wherein said latch element is configured to engage the raised shelf.

8. A rackmount distribution panel for storing and accessing telecommunications cables, the rackmount distribution panel comprising: a frame configured to be mounted to a rack; a front tray movably engaged with the frame and movable in a forward direction with respect to the frame when the frame is mounted to the rack, the front tray comprising a plurality of cable controls configured to receive and secure a first cable and to provide access to the first cable from a front of the frame by moving in the forward direction, wherein the front tray is further movable in a rear direction with respect to the frame when the frame is mounted to the rack and to provide access to the first cable from a rear of the frame by moving in the rear direction, the rear direction being opposite the forward direction; and
   a rear tray comprising a latch element located in an opening in a rear surface, and a plurality of cable controls extending upwardly from a bottom surface of the rear tray, wherein said rear tray is movably engaged with the frame and movable in the rear direction with respect to the frame when the frame is mounted to the rack, said plurality of cable controls of the rear tray being configured to receive and secure a second cable and to provide access to the second cable from the rear of the frame by moving in the rear direction; wherein the front tray and the rear tray are removable from the rear of the frame by moving the front tray and the rear tray in the rear direction, wherein the rear tray is substantially underneath the front tray; and wherein the front tray comprises a raised shelf with a tab that extends through said opening in the rear surface of said rear tray when the front tray and the rear tray are positioned in the frame.

9. The rackmount distribution panel of claim 8, wherein said latch element is configured to engage the raised shelf.

\* \* \* \* \*